US012583018B2

(12) United States Patent
Faucher et al.

(10) Patent No.: US 12,583,018 B2
(45) Date of Patent: Mar. 24, 2026

(54) SYSTEM AND METHOD TO MAKE COMPLIANT ROWS OF WOOD PIECES TO BE PACKAGED

(71) Applicant: MEKANIKA INC., Sainte-Marie (CA)

(72) Inventors: Patrice Faucher, Sainte-Marie de Beauce (CA); Richard Audet, Sainte-Marie de Beauce (CA)

(73) Assignee: MEKANIKA INC., Sainte-Marie (CA)

( * ) Notice: Subject to any disclaimer, the term of this patent is extended or adjusted under 35 U.S.C. 154(b) by 0 days.

(21) Appl. No.: 18/989,971

(22) Filed: Dec. 20, 2024

(65) Prior Publication Data

US 2025/0121412 A1 Apr. 17, 2025

Related U.S. Application Data

(62) Division of application No. 18/170,234, filed on Feb. 16, 2023, now Pat. No. 12,172,193.

(60) Provisional application No. 63/268,096, filed on Feb. 16, 2022.

(51) Int. Cl.

| | |
|---|---|
| ***B07C 5/36*** | (2006.01) |
| ***B07C 5/04*** | (2006.01) |
| ***B07C 5/342*** | (2006.01) |
| ***B07C 5/38*** | (2006.01) |
| ***B65B 11/00*** | (2006.01) |

(52) U.S. Cl.

CPC ................ *B07C 5/362* (2013.01); *B07C 5/04* (2013.01); *B07C 5/3422* (2013.01); *B07C 5/38* (2013.01); *B65B 11/004* (2013.01); *B07C 2501/0063* (2013.01)

(58) Field of Classification Search

CPC .. B07C 5/04; B07C 5/342; B07C 5/36; B07C 5/38; B07C 2501/0063; B65B 11/00

See application file for complete search history.

(56) References Cited

U.S. PATENT DOCUMENTS 3,011,903 A * 12/1961 Clock ...................... B05D 7/06 427/393
4,614,555 A * 9/1986 Smith ...................... B27G 1/00 156/356
6,510,364 B2 * 1/2003 Ahrens .................. B65G 61/00 198/418.2
6,598,747 B1 * 7/2003 Ahrens .................. B65G 61/00 700/223

(Continued)

*Primary Examiner* — Joseph C Rodriguez

(74) *Attorney, Agent, or Firm* — Brouillette Legal Inc.; Philippe Brouillette

(57) ABSTRACT

A system and method for scanning, sorting, repairing and packaging hardwood flooring pieces is provided. The system provides a scanning section, a sorting section, an assessment section and a packaging section. The scanning section identifies problematic pieces. The sorting section automatically sorts and completes rows of hardwood flooring pieces. The assessment section filters and repairs identified pieces and the packaging section packages rows of hardwood flooring pieces. The use of manpower may be limited to certain tasks only, such as the analysis of the identified boards, the repairing or the packaging. An algorithm is tracking each of the pieces of the system and may thus manage the optimal functioning of the system. A method for scanning, sorting, assessing and packaging hardwood flooring pieces is further provided.

20 Claims, 14 Drawing Sheets

(56) References Cited

U.S. PATENT DOCUMENTS

| | | | | |
|---|---|---|---|---|
| 7,356,175 | B2 * | 4/2008 | Lee | G01N 21/8986 382/141 |
| 8,082,960 | B2 * | 12/2011 | Lapointe | B65G 47/26 144/357 |
| 8,918,976 | B2 * | 12/2014 | Townsend | G06T 7/0004 29/772 |
| 11,222,419 | B1 * | 1/2022 | Bolton | G06T 7/90 |
| 12,172,193 | B2 * | 12/2024 | Faucher | B07C 5/3422 |
| 12,377,546 | B2 * | 8/2025 | Audet | B65G 61/00 |
| 2004/0025654 | A1 * | 2/2004 | Olsen | B27B 31/08 83/72 |
| 2005/0147286 | A1 * | 7/2005 | Lee | G01N 21/8986 382/141 |
| 2008/0223487 | A1 * | 9/2008 | Ahrens | B07C 5/14 144/41 |
| 2008/0223767 | A1 * | 9/2008 | Ahrens | B07C 5/04 198/377.04 |
| 2022/0161454 | A1 * | 5/2022 | Bolton | B27D 3/02 |
| 2024/0300138 | A1 * | 9/2024 | St. Germain | B27D 1/08 |

* cited by examiner

SYSTEM AND METHOD TO MAKE COMPLIANT ROWS OF WOOD PIECES TO BE PACKAGED

CROSS-REFERENCE TO RELATED APPLICATIONS

The present patent application is a divisional application of the U.S. patent application Ser. No. 18/170,234, entitled "SYSTEM AND METHOD FOR QUALITY CONTROL OF WOOD PIECES TO BE PACKAGED", and filed at the United States Trademark and Patent Office on Feb. 16, 2023, which claims the benefits of priority of U.S. Provisional Patent Application No. 63/268,096, entitled "SYSTEM AND METHOD FOR QUALITY CONTROL OF WOOD PIECES TO BE PACKAGED", and filed at the United States Patent Office on Feb. 16, 2022, the content of the said patent applications being incorporated herein by reference.

FIELD OF THE INVENTION

The present invention generally relates to the field of systems for lines of production of wood flooring pieces. More precisely, the present invention relates to the field of systems and methods for automatically sorting and packaging hardwood flooring pieces of a production prefinished line.

BACKGROUND OF THE INVENTION

When manufacturing hardwood flooring pieces, the pieces are typically cut in different lengths. The pieces having different lengths are combined to form one or more rows having a combined length having predetermined dimensions, typically dimensions to be inserted in standard packaging.

The pieces are then treated, painted and/or varnished. After being treated, the wood pieces are manually inspected for quality, typically by a person standing aside of the production line. The inspection may comprise marking defects or zones having a different level of quality. The inspection may further comprise discarding or removing from the line the non-complying pieces.

The inspected wood pieces are then conveyed to a packaging worker. The packaging worker generally picks up the incoming pieces to insert them into a package. When a received wood piece is non-compliant, workers analyze and sort the piece before placing the wood pieces in the said package or discarding. One of the drawbacks of having humans analyzing, sorting and packaging hardwood flooring pieces is that the functionality of the system depends upon a single node, which is the user. Accordingly, the risks of having the system slowed or stopped are incredibly high. It may also be noted that the tasks of analyzing and sorting the wood pieces may be very difficult physically and mentally for workers. There is thus a need for a system that automates some of the tasks required for the scanning, sorting, analysis, repairing and packaging of hardwood flooring pieces.

SUMMARY OF THE INVENTION

The aforesaid and other objectives of the present invention are realized by generally providing a system for automatically sorting board pieces, the system comprising: a board characteristic detector for inspecting and identifying characteristics of the board pieces; and an automatic board sorter for separating the board pieces identified by the detector as comprising one or more non-compliant characteristics, the automatic board sorter directing the board pieces identified as comprising the one or more non-compliant characteristics to an assessment station, the assessment station receiving the board pieces identified as comprising the one or more non-compliant characteristics and assessing if the said received board pieces are usable or discardable, the assessment station being configured to return the usable board pieces to the sorter.

In an aspect of the invention, the system further comprises a packaging station for receiving the board pieces without a non-compliant characteristic or being assessed as usable. The sorter may further comprise an automatic board pieces splitter for splitting board pieces of a panel of pieces received from the detector.

In an aspect of the invention, the sorter further comprises a robotized arm for manipulating and displacing the board pieces to be sorted. The sorter may further comprise an accumulation system for the robotized arm to store the board pieces to be sorted at a later time. The sorter may further comprise an extended accumulation system for receiving the board pieces to be stored.

In an aspect of the invention, the sorter further comprises an assessment port to direct the board pieces identified as comprising the one or more non-compliant characteristics to the assessment station. The assessment port may comprise an output conveyor for sending out the board pieces identified as comprising the one or more non-compliant characteristics to the assessment station; and an input conveyor for receiving the board pieces identified as being usable at the assessment station.

In another aspect of the invention, a system for automatically sorting board pieces of panel of pieces comprising a plurality of rows is provided. The system comprises a board characteristic detector for inspecting and identifying characteristics of the board pieces of the panel, an automatic board splitter for separating the rows of the panel identified by the detector as comprising one or more board piece having non-compliant characteristics and an automatic row builder for receiving board pieces identified as being compliant and forming complete rows of compliant board pieces.

The system may comprise a robotic arm for picking split board pieces identified as being compliant or as having one or more non-compliant characteristics amongst the board pieces of the split row. The robotic arm may be configured to combine the picked board pieces to form one or more rows having a predetermined length and comprising compliant board pieces. The row builder may comprise one or more sorting rows for forming the one or more rows of compliant board pieces. The system may comprise a row stopper or an area adapted to stop the split row upstream of the row builder. The robotic arm may be configured to replace one or more board pieces identified as having one or more non-compliant characteristics amongst the split board pieces of the stopped split row with a board piece present on the one or more sorting rows. The robotic arm may be configured to pick a board pieces identified as being compliant from the stopped row and to move the picked board piece to one of the one or more sorting rows to form a compliant row.

The sorting row may further comprise a releasing mechanism to release the board pieces present on the sorting row. The releasing mechanism may comprise an actuated pivot.

The system may comprise a controller in data communication with the board characteristic detector, the robotic arm, and the row builder, the controller being configured to monitor and manage the building of rows comprising compliant board pieces.

The system may comprise a peripheral accumulation system handling excess or temporarily unused board pieces.

The system may comprise a conveyor for routing the split row comprising compliant board pieces to be further processed and for routing the split row comprising at least one board piece having one or more non-compliant characteristics toward the automatic row builder. The conveyor may comprise superposed upper and lower conveyors, the upper conveyor routing the split row to the automatic row builder and the lower conveyor routing the split row to be further processed.

In yet another aspect of the invention, a method for automatically sorting and combining compliant board pieces of a panel pieces is provided. The method comprises detecting characteristics of the board pieces of the panel, splitting rows of the board pieces of the panel identified by a detector as comprising one or more board piece having non-compliant characteristics, removing one or more board pieces from the split row and combining compliant board pieces to form compliant rows having a total predetermined length.

The removal of the board pieces may comprise removing the board pieces having non-compliant characteristics from the split row. The method may comprise replacing the removed non-compliant board piece with an accumulated board piece identified as being compliant. The removal of the board pieces may comprise removing one or more of the board pieces identified as compliant to add to a row of compliant board pieces. The method may comprise accumulating the removed compliant board pieces to be combined with compliant board pieces to be remove from another split row to form a row of compliant board pieces having the predetermined length.

The method may comprise releasing the combined board pieces forming a compliant row to be further processed. The method may comprise prioritizing the combination of shorter board pieces to maximize material efficiency.

In an aspect of the invention, the assessment station comprises a feedback system for identifying characteristics of the board pieces outputted from the assessment station.

In an aspect of the invention, the assessment station is manually operated by a user, the user assessing if the received board pieces are usable or discardable and the user placing the usable board pieces on a conveyor toward the sorter.

In an aspect of the invention, the system further comprises a controller in data communication with the board characteristics detector, the sorter and the assessment station, the controller comprising a memory for storing location of board pieces and detected characteristics of the board pieces. The controller may be a remote server.

In an aspect of the invention, the board characteristics detector comprises a wood scanner.

In an aspect of the invention, the board characteristics detector comprises an identification device for marking the board pieces.

In yet another aspect of the invention, a system for automatically sorting board pieces is provided, the system comprising: a board characteristic detector for inspecting and identifying characteristics of the board pieces; an automatic board sorter for separating the board pieces identified by the detector as comprising one or more non-compliant characteristics, the sorter comprising a robotized arm for manipulating and displacing the board pieces identified by the detector as comprising the one or more non-compliant characteristics.

In yet another aspect of the invention, a method for automatically sorting board pieces is provided, the method comprising: automatically detecting characteristics of the board pieces to be sorted; automatically sorting the board pieces comprising one or more non-compliant characteristics; moving the board pieces identified as comprising one or more non-compliant characteristics to an assessment station; assessing if the received board pieces are usable, repairable or discardable; moving the board pieces assessed as usable to be sorted or repairing the repairable board pieces and sending the repaired board pieces to be sorted. The method may further comprise automatically packaging the sorted board pieces being usable or being repaired. The method may further comprise: automatically folding cardboard sheets to create packages; and filling the folded packages with rows of board pieces to be packaged.

In an aspect of the invention, the method further comprises transmitting and storing in a memory the identified characteristics and position of the board pieces.

In an aspect of the invention, the method further comprises using a robotized arm to manipulate and move the board pieces within the sorter with a robotized arm. The method may further comprise accumulating one or more of the board pieces to be sorted using the robotized arm.

In an aspect of the invention, the method further comprises splitting the detected board pieces from a panel of board pieces.

In an aspect of the invention, the method further comprises calculating occupancy and the efficiency levels of the automatic sorting method.

The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE INVENTION

A novel system and method for quality control of wood pieces to be packaged will be described hereinafter. Although the invention is described in terms of specific illustrative embodiment(s), it is to be understood that the embodiment(s) described herein are by way of example only and that the scope of the invention is not intended to be limited thereby.

Figure 1:
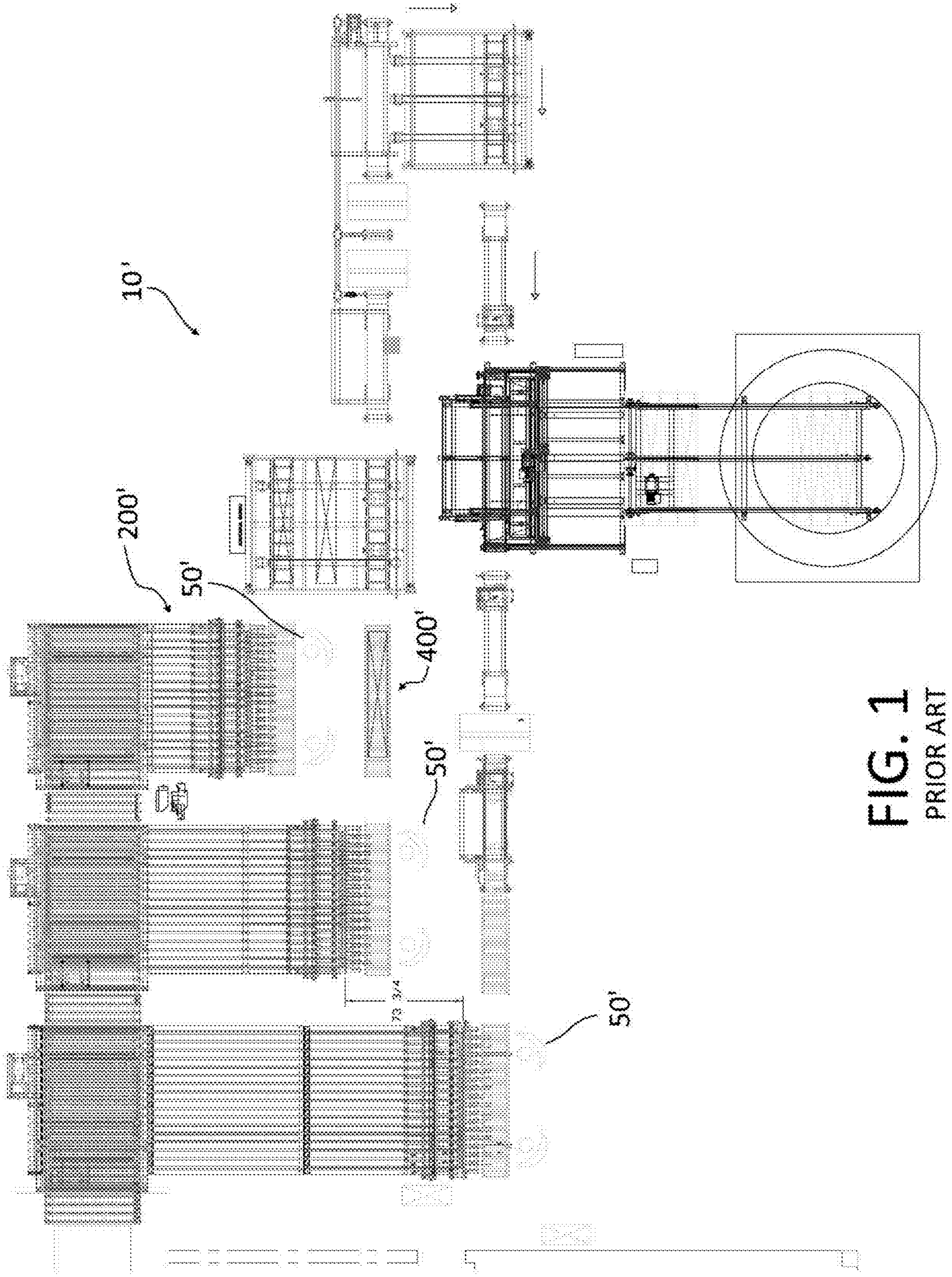
FIG. 1 PRIOR ART
FIG. 1 is a top plan view of a prior art system for inspecting and packaging hardwood flooring pieces.

Referring to FIG. 1, a prior art system 10' for inspecting and packaging wood is shown. Broadly, hardwood flooring pieces are conveyed to a plurality of inspection/sorting 200' and packaging 400' areas. In the inspection/sorting 200' and packaging 400' areas of the system 10', rows of wood pieces may be singled out from other rows in a bundle before being manipulated by users 50'. The workers 50' broadly pick up a word piece of the conveyor, visually inspect the wood piece, sort the wood piece in one of predetermined quality level and place the pieces in a packaging associated to the identified quality level. During such process, the worker 50' identifies if the picked-up piece will fit in a line of other wood pieces for packaging purposes. In some instances, the worker may remove from the packaging area 400' the pieces which are not meeting acceptable quality standards. Understandably, the speed and/or efficiency of the inspection/sorting 200' and packaging 400' areas are strongly dependent at the speed at which workers are completing the above-described process. Indeed, such process generally requires a high degree of training, analysis, concentration and agile movements.

Figure 2:
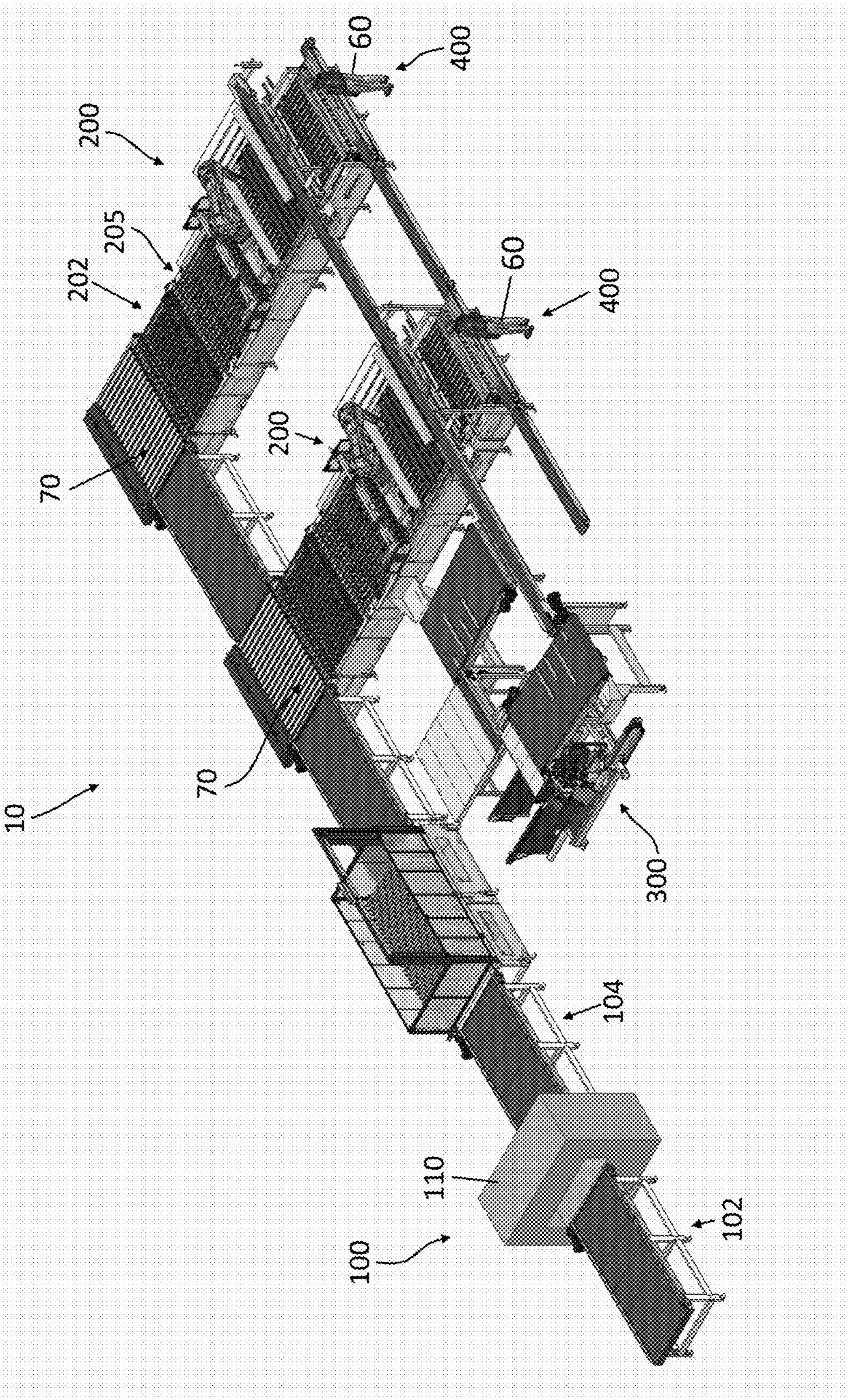
FIG. 2 is a front perspective view of an exemplary wood board production line comprising a system for controlling quality of wood pieces and a packaging system in accordance with the principles of the present invention.
Figure 3:
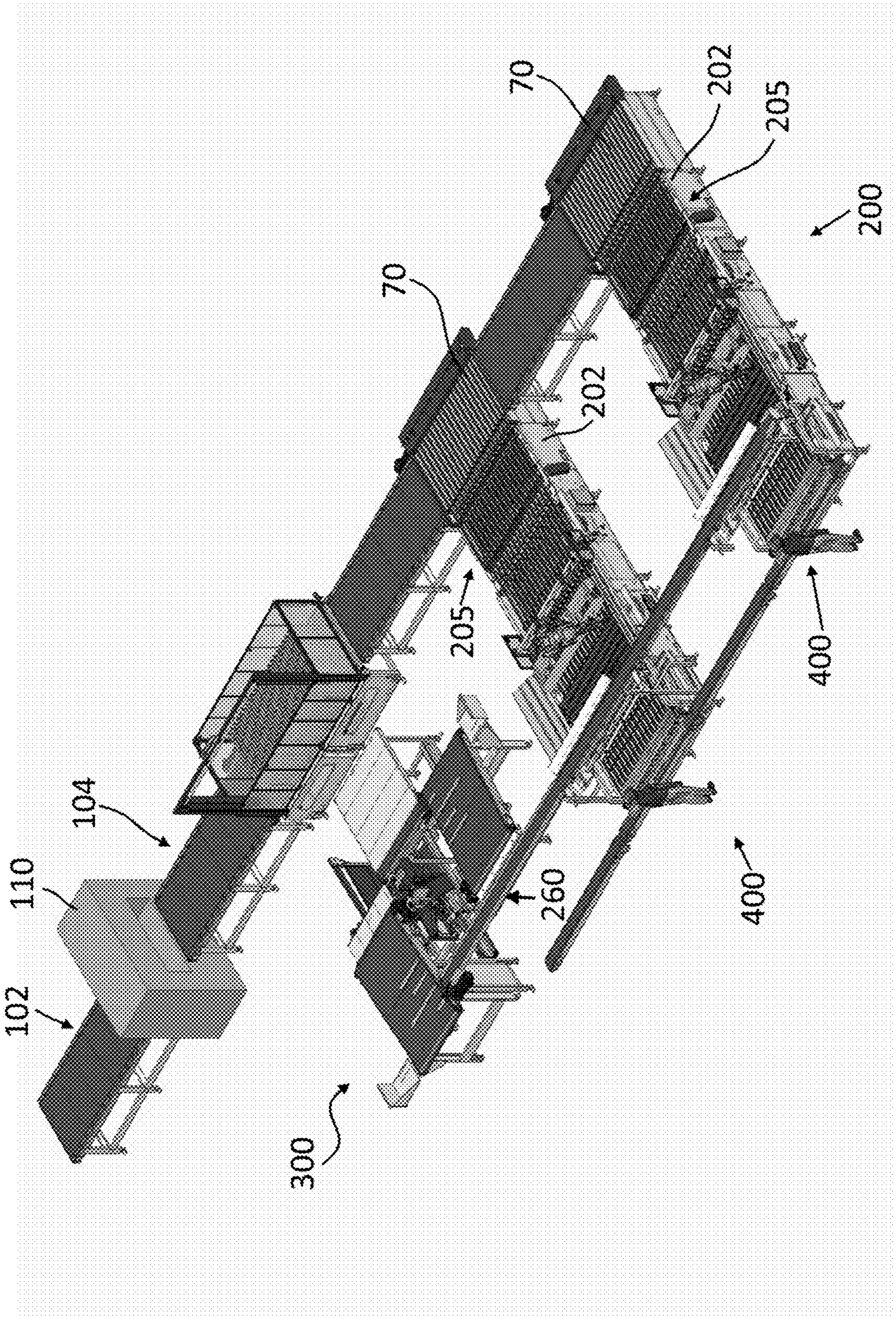
FIG. 3 is rear perspective view of the production line of FIG. 2.
Figure 4:
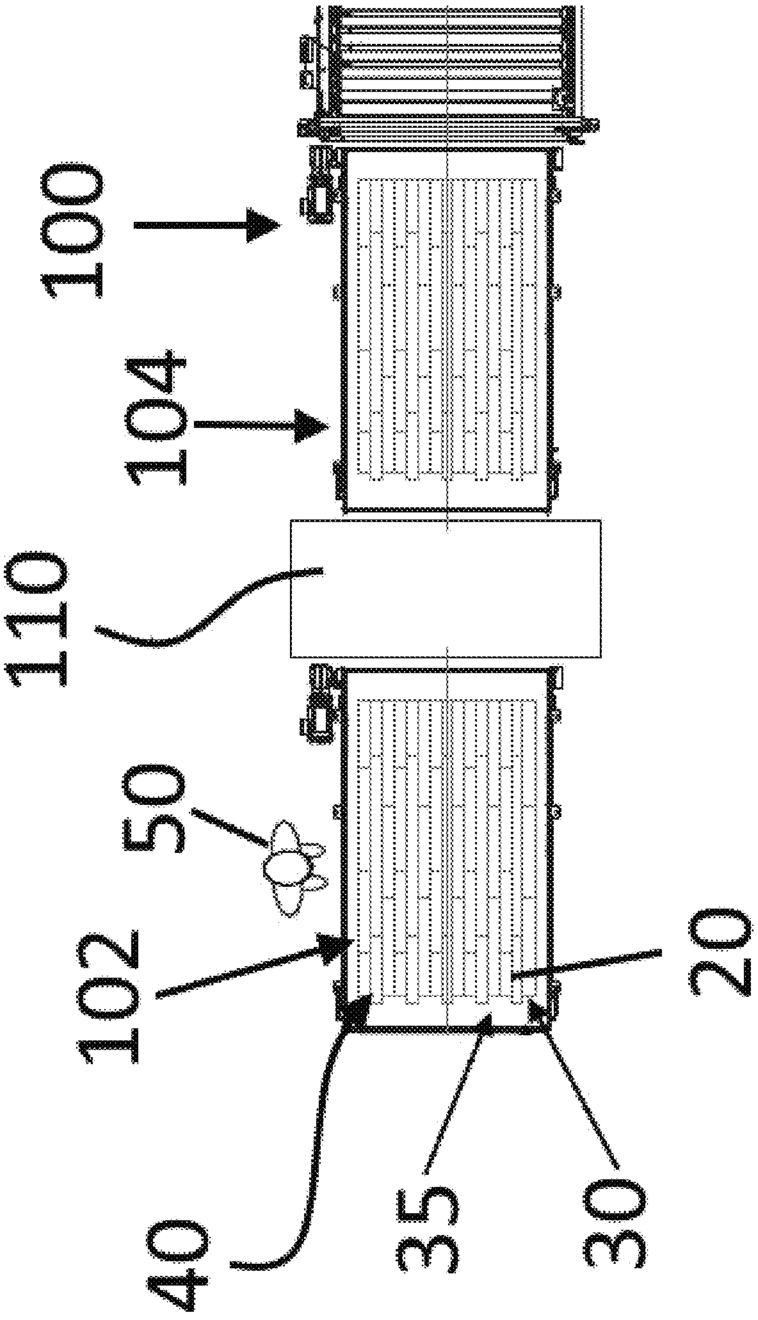
FIG. 4 is a top plan view of an embodiment of a detecting station in accordance with the principles of the present invention.

Now referring to FIGS. 2 to 4, an embodiment of a production line 10, also referred to as a system, for inspecting, filtering and packaging hardwood flooring pieces is illustrated. Broadly, the system 10 automates the inspection, the sorting/filtering and the packaging of hard wood pieces. In a preferred embodiment, the wood pieces outputted by a surface processing apparatus are disposed as a panel containing a plurality of rows of wood pieces. The said panels are fed to the system 10. As examples, the surfaces of the wood pieces may be processed with any type of surface processing, such as but not limited to a varnishing process, an oiling process, etc.

The embodied system 10 comprises a detecting station 100, a sorting station 200, an assessment station 300 and a packaging station 400. The system 10, with each or a selection of the aforementioned stations, is configured to be fed with hardwood flooring pieces 20 and to outfeed hardwood flooring pieces 20 meeting a predetermined level of quality. In an embodiment, the wood pieces 20 are fed already combined with other pieces 20 to form a panel 40 having a predetermined area. The formed panel 40 generally comprises predetermined lengths of hardwood flooring 30, also referred to as rows, which are received side by side with other lengths of boards 30 to create the panel 40. In some embodiments, the panel 40 may comprise between 10 to 15 rows of hardwood flooring 30. Understandably, the panel 40 may comprise any other number of rows. Each row may comprise a plurality of wood pieces 20 have different or similar lengths.

In a further embodiment, the fed wood pieces 20 may originate from any other prior station, such as treatment stations known in the art for the treatment of hardwood flooring boards. As an example, the treatment may comprise applying a varnish coating the surface of the boards 20. As opposed to prior art system, it may be appreciated that the scanning 100, sorting 200, assessing 300 and packaging 400 operations are performed independently. Yet, in some embodiments, some operations could be combined in a single station.

In some embodiments, the detecting station 100 may comprise an infeed section 102. The infeed section 102 generally allows wood pieces 20 to be fed by any means known in the art. The infeed section 102 is typically embodied as a conveyor. In some embodiments, the detecting station 100 comprises a detecting or sensor device 110 adapted to detect one or more characteristics of the fed wood pieces 20. The detecting device 110 may be configured to detect identifiable characteristics, such as but not limited to length, width, patterns, colors, defects, thickness, etc. The detecting device 110 may be embodied as scanner, a measuring device, a presence detector, a length detector, a video or image camera or any other automated equipment configured to detect specific characteristics of the boards 20. The detecting device 110 may be configured to identify and single out specific characteristics of the fed wood pieces 20.

The detecting device 110 may be further configured to identify the number, location, volume and/or dimensions of boards 20. The identified characteristics of the boards 20 may thus be used by any of the stations (100, 200, 300 and/or 400) to track and/or manipulate the detected boards 20. Upstream of the detecting device 110, an operator (not shown) may identify wood pieces 20 with a UV device, such as a UV pencil. The identified pieces 20 marked by the UV device may be pieces having a risk of not being properly detected by the detecting device 110.

The detecting station 100 may further comprise an identification or marking device (not shown). The identification device is configured to mark the wood pieces 20. As such, the identification device may be configured to mark specific areas of single pieces 20, a row 30, a layer 35 or a panel 40. The applied marks may identify a characteristic, a quality grade or any other identification information about the wood pieces. The identification device may be configured to physically mark the wood pieces. As such, the identification device may apply a mark on identified pieces 25. The identification device may perform a similar task as an operator identifying wood pieces 20 using a UV identification marker or tool. The detecting station 100 may further be configured to store in memory the characteristics of each piece 20 of a row 30, of a layer 35 or of a panel 40. Understandably, the detecting station 100 may comprise a storage device, such as a hard disk or persistent memory, or may be in communication with a remote controller or computer configured to store the characteristics of the pieces 20.

As an example, the memory may comprise a digital representation of each row 30 comprising a digital representation of each piece 20. Understandably, the detecting station 100 may be in communication with the other stations or mechanisms of the system 10, such as through a network or through data connections. For example, a central controller in communication with the different stations may be programmed to track the identified pieces 25 through their displacement in any of the sections of the system 10 and may thus be aware of the position of the pieces 20, such as in real-time or in near real-time.

Still referring to FIGS. 2 and 3, the sorting station 200 is typically positioned downstream of the detecting station 100. In the illustrated embodiment, a conveyor 70 redirect the boards incoming from the detecting station 100 toward the sorting station 200.

The sorting station 200 may comprise one or more feed control mechanisms 205. The feed control mechanisms 205 typically split the panels 40 into layers 35 or rows 30 and controls feeding a downstream portion of the sorting station 200. In some embodiments, the feed control mechanisms 205, also referred to as breaker, may further be configured to separate individual planks 20 of a row 30. The feed control mechanisms 205 is generally activated by servomotors controlling tabs or pivoting tabs in order to separate rows 30, layers and/or planks 20. Understandably, any other means of separating a panel 40 may be used. In an embodiment, the feed control mechanisms 205 may be controlled by an automate/controller in data communication with the detecting station 100. The detecting station 100 may communicate the digital representation, such as scanned representation, of each panel 40, row 30, layer 35 or plank 20 to the controller. The controller uses the digital representation to activate the feed control mechanism 205.

In a typical embodiment, the digital representation of the rows 30 comprises identification of unwanted characteristics or other characteristics used to filter away the individual planks 20 of rows, as identified by the detecting station 100. The feed control mechanisms 205 splits planks 25 associated with unwanted characteristics away from other rows 30 of a panel 40 or layer 35. If a panel 40 or layer 35 does not comprise planks 25 identified as to be split, the feed control mechanism 205 then displaces the panel 40 or layer 35 towards the sorting station 200 without splitting the said panel. In typical embodiments, each layer 35 comprises between 1 to 5 rows of planks 30, such as to form the width of a box. It may thus be understood that a panel 40 may be comprised of a plurality of stacked layers 35. Understandably, the present invention may be adapted to use panels 40 and layers 35 having any number of rows.

The controller 500 may activate the feed control mechanism 205 of the sorting station 200 to split a panel 40 to allow some repaired planks to be inserted in a row 30 or layer 35 or to let the sorting station 200 form a new row 30 of the panel 40. As such, the controller may be in data communication with the assessment station 300. In such embodiment, the assessment station 300 notifies the controller when a repaired plank is conveyed back to the sorting station 200.

After passing through the feed control mechanisms 205 and after possibly being split, each row 30, or a plurality of rows 30 in a layer 35, is conveyed toward the robotized arm 230 of the sorting station 200. Accordingly, the feed sorting mechanism 205 may split a panel 40 in any number of rows 30. The number of rows being split is typically a function of the analysis received from the scanning station 100 and may generally be based at least on the desired width of a layer 35.

In some embodiments, the controller 500 is in data communication with the scanning station 100. The scanning station 100 communicates to the controller 500 a data matrix comprising characteristics of the scanned boards 20 for each row 30. The characteristics comprise at least defects or areas to be repaired, if applicable. Based on the data matrix, the controller 500 controls the splitting of the rows 30. As an example, if a row 30 comprises at least one board having a defect 25, the said row 30 shall be split from the panel 40 or layer 35. Thus, the controller 500 requests the feed control mechanism 205 to split the said row 30 from the panel 40 or layer 35. In an example of a layer 35 having three (3) rows 30, if the board identified as having a defect 25 is positioned in the middle row 30, the controller 500 instructs the feed control mechanism 205 to split after the first row 30 and to split after the second row 30 to break loose the said middle row 30. The robotized arm may 230 may then pick up the board 25 to be repaired from the conveyor 210 to send it to the assessment station 300. In some embodiments, the controller 500 could instruct the robotized arm 230 to pick up a piece (20, 25) from the reserve to replace the board to be repaired in the split row or could instruct the robotized arm 230 to pick up remaining pieces of the split row and add them to the reserve 240 or extended reserve 250.

In other scenarios, the controller 500 may request the feed control mechanism 205 to split one or more rows 30 to complete a layer 35 awaiting to be packaged. As an example, assuming a panel 40 having no defect identified on the boards 20, if a single row 30 awaits at the packaging station 400, the controller 500 send a request to the feed control mechanism 205 to split between the second and the third rows 30 of the panel 40. The said split two rows 30 may then be conveyed to the packaging station 400 to be combined with the awaiting row 30. The combined rows 30 may then form a layer 35 to be packaged.

In yet another scenario, the controller 500 may send a request to the feed control mechanism 205 to split a row 30 of a panel 40 or layer 35 to fill the reserve 240 or extended reserve 250. As an example, if the reserve 240 is identified as being nearly empty, the controller 500 requests the feed control mechanism 205 to split a row 30. The boards 20 of the said split row 30 are then picked up by the robotized arm 230 and laid out on the reserve 240. Understandably, the same method could be used to add pieces 20 to the extended reserve 250.

In yet other embodiments, if there are no incomplete layers 35 waiting at the sorting station 200 or at the packaging station 400, or if completing a layer 35 is less optimal than forwarding a new complete one, the feed sorting mechanism 205 may instead send out complete layers 35 from the panel 40 to be sent to the packaging station 400 directly.

In another embodiment, if the controller determines that there are too many planks 20 and rows 30 located on the sorting rows 242 and/or the peripheral rows 250 which could bottleneck the system 10, the controller may prioritize using said rows 30 and planks 20 in combination with incomplete layers 35 from the feed control mechanism 205 to send complete layers 35 to the packaging station 400 rather than sending out complete layers 35 from the feed control mechanism 205.

Understandably, many other scenarios may be covered by the controller 500 when commanding the feed control mechanism 205 to split a single or multiple rows 30 of a panel 40 or layer 35. Obviously, the controller 500 may also decide to let the panel 40 be conveyed as is (i.e., no splitting of the panel) if all the boards 20 are compliant and if the packaging station 400 may receive the unsplit panel.

In some embodiments, the system 10 may comprise more than one sorting station 200. Broadly, a sorting station 200 is configured to pick up any piece not complying with predetermined quality level or including predetermined characteristics, such as but not limited to unwanted characteristics. As explained above, the picked-up pieces may have been marked and/or identified by the detecting device 110. The robotized arm picks up such piece 25 and moves toward the repair/inspection station 300, typically using the conveyor 260. As a piece is picked-up from the conveyed panel 40, an empty space is left in a row 30 or in a layer 35. The picked-up pieces are typically replaced with a piece present on the reserve 240, on the extended reserve 250 or on the repaired pieces reserve 272. If there are no pieces 20 present in the reserve 240, extended reserve 250 or repaired pieces reserve 272 having dimensions adapted to replace a picked-up piece or to complete a row 30, then the remaining pieces 20 of the row 30 may be stored in any one of the reserves (240, 250, 272).

In some cases, the sorting station 200 may pick-up a compliant piece of a layer 35 and may move the said picked-up piece to the reserve 240 or the extended reserve 250. The robotized arm 230 may pick up compliant pieces 20 to restock the reserves 240/250 or to remove remaining compliant pieces of a row 30 or layer 35 comprising many picked-up non-compliant pieces 25.

In some other embodiments, additional sorting stations 200 could be used to increase production speed. In such embodiments, the central controller 500 may be configured to select the destination of each detected panel 40 and to route each detected panel 40 to a different sorting station 200 to balance work load of the system 10. In other embodiments, each sorting station 200 may sort different grades of panels 40.

Figure 5:
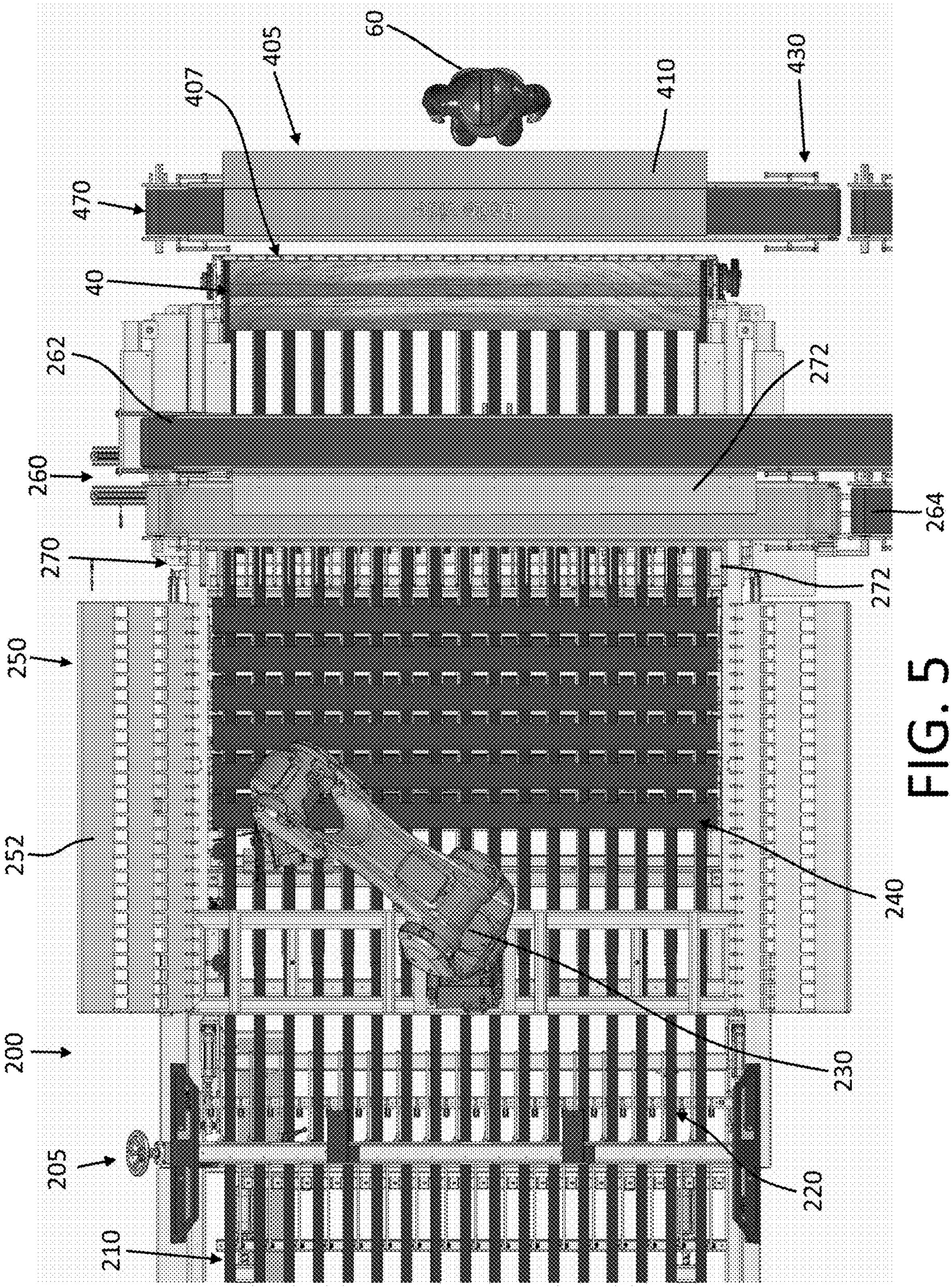
FIG. 5 is a top plan view of an embodiment of the sorting station of the production line of FIG. 2.
Figure 6:
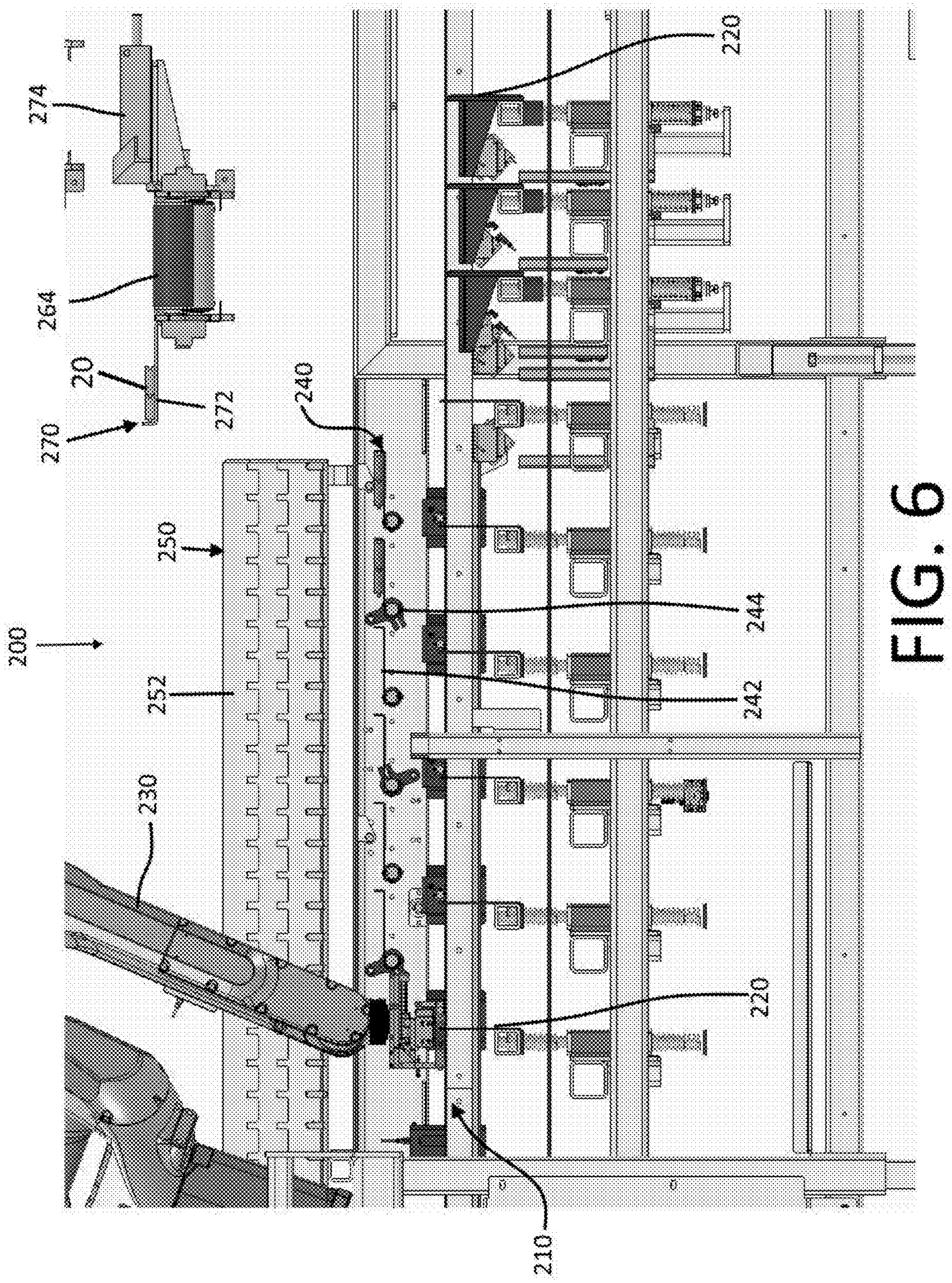
FIG. 6 is a side elevation view of the sorting station of FIG. 2.

In the illustrated embodiment of FIGS. 5 and 6, the sorting station 200 comprises a conveying system 210, a feed control mechanism 205, a robotic arm 230, an accumulation system or row builder 240, a peripheral accumulation system or reserve 250 and a repair port 260. The feed control mechanism 205 may comprise a conveying system 210 for displacing the pieces 20. The embodied conveying system 210 is a conveyor having a width adapted to at least receive a complete row 30 of wood pieces 20. In some embodiments, the feed control mechanism 205 may comprise controllable tabs 220. The tabs 220 are adapted to stop conveying of the panel 40, layers 35 and/or of rows 30. The tab 220 may further be adapted to split rows 30 of a panel 40 or layer 35.

In some embodiments, the feed control mechanism 205 may further comprise sensors, not shown. The sensors may be positioned anywhere over or along the conveying system 210 and/or the sorting station 200. In the illustrated embodiment, the sensors are in communication with the controller 500. As examples, the sensors may comprise weight sensors, proximity sensors, cameras, radars, etc. Upon detecting a wood piece 20 or a row 30, the sensor sends a signal to the controller 500. Based on the data regarding the panel 40, layer 35 or rows 30 received from the detecting station 100 or in memory of the controller 500, the controller 500 has access to the characteristics of each piece of wood 20.

The sorting station 200 further comprises a robotic arm 230. Understandably, any other controllable or manipulable member allowing picking up and releasing wood pieces could be used within the scope of the present invention. The robotic arm 230 generally comprises multiple joints, allowing different axis of rotation. The robotic arm 230 is configured to manipulate board pieces 20. The robotic arm 230 is configured/programmed to reach and grab wood pieces 20 from the conveying system 210. The robotic arm 230 may comprise any means known in the art to manipulate the board pieces 20, such as suction cups, pliers, vacuum balls with grains inside, pincers, etc. The robotic arm 230 is in communication with the controller 500. The controller 500 is programmed to send commands to the robotic arms 230, such moving, picking up, releasing commands. As described above, the characteristics of the detected wood pieces 20 are stored in memory or at least accessible to the controller 500. As the presence of the wood pieces 20 in memory are identify by the conveying system 210, the controller 500 sends a command to the robotic arm 230 to pick up any wood piece 20 of the row 30, layer 35 or of the panel 40 present on the conveying system 210 which does not meet predetermined characteristics. Understandably, the controller 500 and robotic arm 230 may be integral or the robotic arm may be programmed to move based on information received from other stations.

The sorting station 200 further comprises exemplary accumulation system 240 to store hardwood flooring pieces 20 to form rows of acceptable wood pieces 20. The accumulation system 240 comprises a plurality of sorting rows 242 and a releasing mechanism 244. Understandably, each sorting row 242 may be long enough to receive some pieces 20 or a complete row 30 of pieces 20. The accumulation system 240 are generally used to store acceptable or compliant wooden pieces 20 in order to form compliant rows to be sent to the packaging station 400. When a sorting row 242 comprises a full row 30 of compliant wood pieces 20, the sorting row 242 releases the said complete row 30 on the conveying system 100 toward the packaging station 400. Each of the sorting rows 242 may comprise a releasing mechanism 244 to release the pieces 20 on the conveying system 210. The releasing mechanism 244 may comprise a pivot 246 at each extremity of the sorting row 242. In such embodiment, the accumulation system 240 or the release mechanism 244 is in communication with the controller 500. The controller 500 may be programmed to trigger the pivoting movement of the releasing mechanism 244, allowing the wood pieces 20 present on a specific sorting row 242 to slide to the conveying system 210. Understandably, any other known means or system adapted to release a row of compliant wood pieces 20 may be used within the scope of the present invention.

Referring to FIGS. 5-9, an embodiment of a sorting station 200 is illustrated. In such embodiment, the robotic arm 230 is in data communication with the central controller 500 and is positioned over the conveying system 210. Understandably, the controller 500 may be configured to send request to the robotic arm 230 or the robotic arm 230 may comprise a controller doing the same. A board of wood pieces comprising a plurality of rows is feed to the detecting station 100. As described above, the detecting station 100 identifies defects or non-conform board pieces 25 present in the board. In a preferred embodiment, the status of each plank 25 or each row of the board is stored in the memory of the controller 500, such as within a memory of the controller 500. The controller 500 is configured to communicate the status of the different board or rows to the splitter 205. If a defect is detected on any of the wood pieces of the board, the splitter 205 splits the rows of the board to isolate the rows containing one or more wood pieces having a defect. As such, the splitter 205 split rows of the board when a defect is present or leave the board unsplit if no defect is detected.

Figure 12:
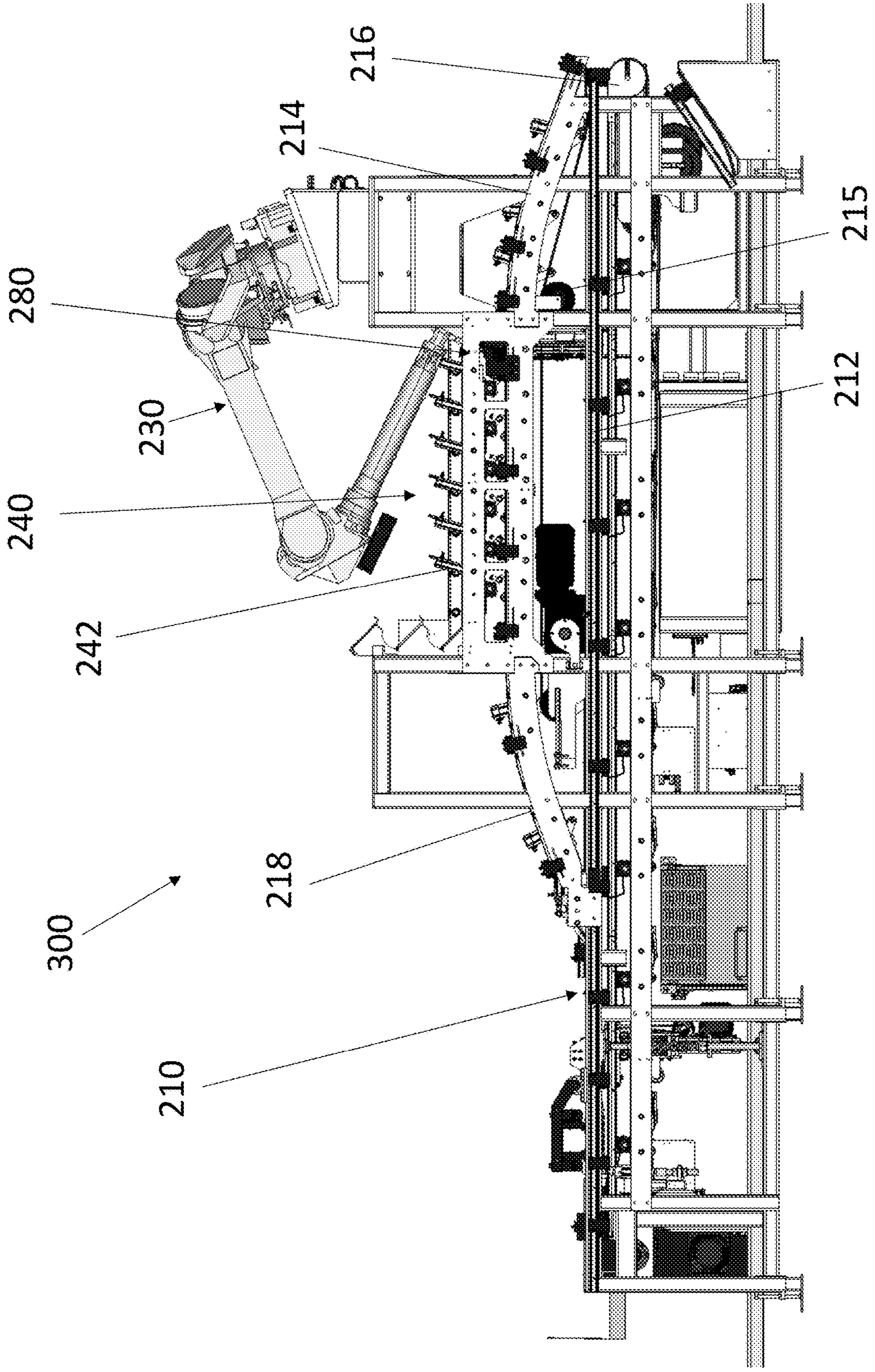
FIG. 12 is a side view of yet another embodiment of a system to make compliant rows of wood pieces to be packaged in accordance with the principles of the present invention.
Figure 13:
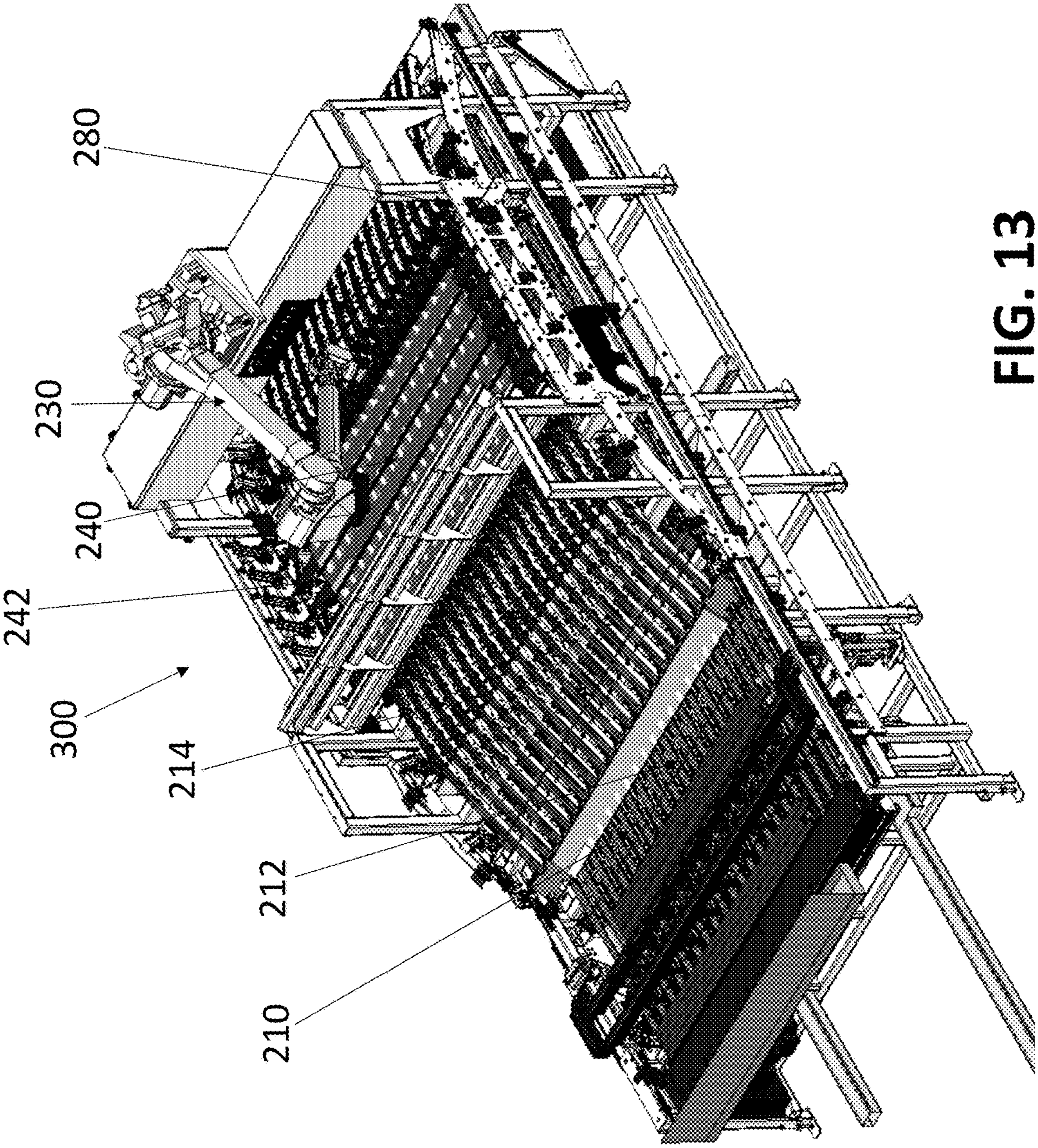
FIG. 13 is a perspective view of the system to make compliant rows of wood pieces to be packaged of FIG. 12.
Figure 14:
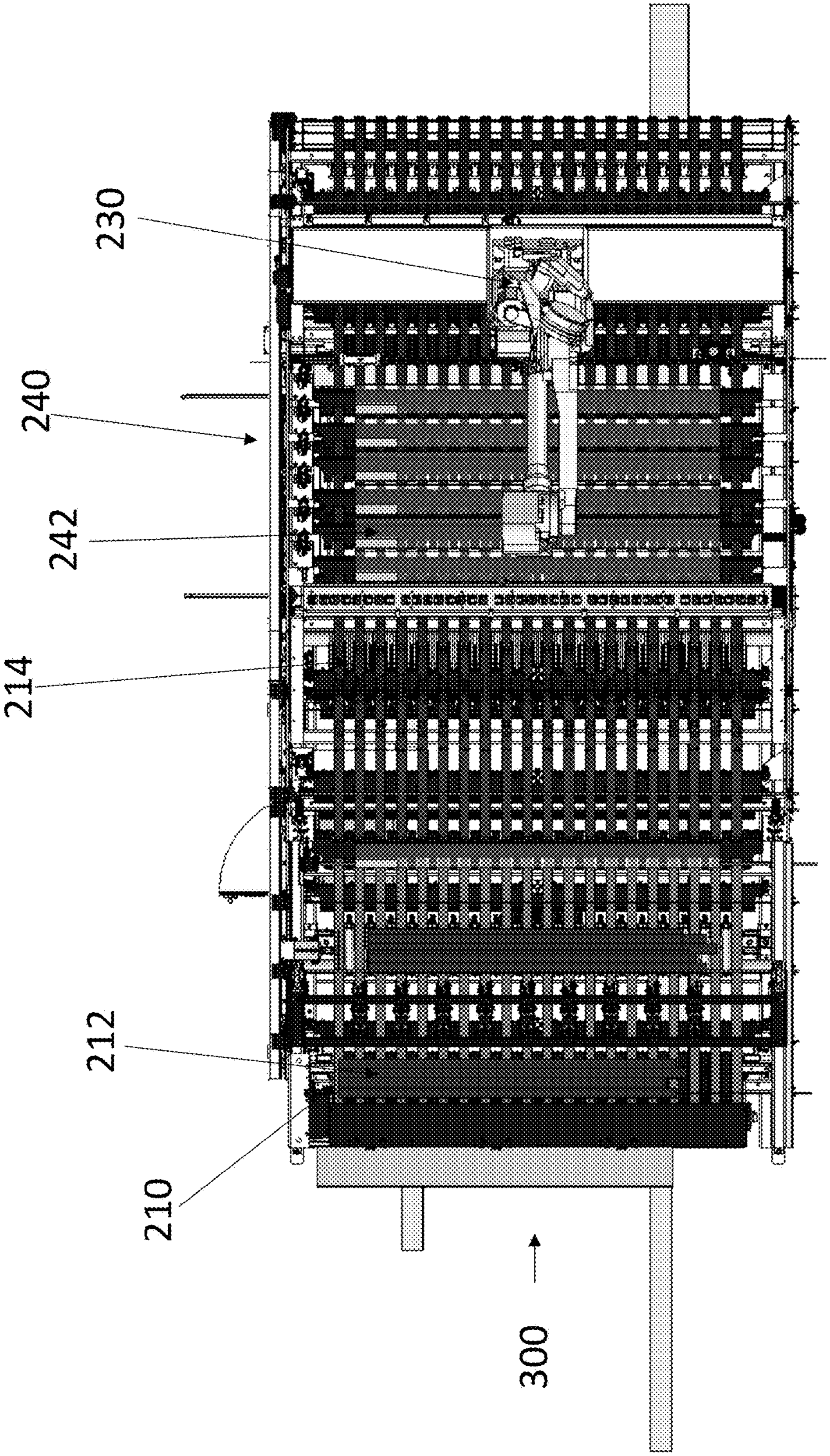
FIG. 14 is a top view of the system to make compliant rows of wood pieces to be packaged of FIG. 12.

Referring now to FIGS. 12-14, yet another embodiment of a system to make compliant rows of wood pieces to be packaged 300 is illustrated. In such embodiment, the conveyor system 210 may comprise an assembly to allow the compliant board pieces to be directly route to skip the sorting assembly 200 or to a next station for further processing, such as but not limited to the packaging station 400. In the illustrated embodiment, the conveyor system 210 comprises superimposed levels, a lower level 212 and an upper level 214. The boards or row having no defect are routed to the lower level 212 and then conveyed to the packaging station 400. The rows containing a board with a defect are routed to the upper level 214 for the robotic arm 230 to pick the wood pieces having a defect.

The conveyor 210 may further be pivotable or adapted to be elevated to allow the upper level 214 to rise above the lower level 212, thus leaving enough clearance for compliant board pieces to be conveyed on the conveyor system 210 to a next station. As such, only one end of the upper level 214 may be risen to provide the required clearance. The conveyor 210 may comprise a conveyor pivot mechanism 216 and an actuating means (not shown), such as an actuator, for rising and lowering the upper level 214. As such, the pivot mechanism can partially or completely tilt or rotate the upper level 214, allowing the compliant row to be conveyed on the lower level 212 but under the upper level 214 for subsequent processing. In such embodiment, the system 300 may further comprises a descent 218 allowing rows released from the accumulator 240 to move toward the next station for further processing, such as moving the packaging station 400. The upper level 214 may further comprise a support element 215, such as idling wheels, adapted to be supported by the lower level 212 when the upper level 214 is lowered. Understandably, any other means to allow passage of the compliant rows toward the next station to skip the sorting system 200 or 300 are envisioned within the scope of the present invention.

The robotic arm 230 is generally positioned at a location allowing picking pieces being moved on the conveyor system 210. Preferably, the robotic arm 230 is positioned above the conveying system 210. The robotic arm 230 is configured to manage and/or control movement and arrangement of wood pieces of a board to and from the accumulation system 240. As such, the sorter 200 receive rows comprising at least one board piece having a defect or being unacceptable. In a preferred embodiment, the row to be sorted is stopped at a location reachable by the robotic arm 230. Understandably, any known method to stop the row may be used within the scope of the present invention. Based on the memorized status of the wood pieces of the board being sorted, the robotic arm 230 is configured to pick the wood pieces identified as having a defect and to move such board to the quality validation system port 260, as detailed below.

The robotic arm 230 is also configured to pick acceptable wood pieces which may remain from the sorted row, such as when one or more wood pieces have been picked from the row or shall be picked. The acceptable wood pieces being picked may be placed in the accumulation system. The sorting system 200 may comprise a detection system adapted to detect the characteristics of the piece to be picked, such as but not limited to the length, using data previously stored or detected by the scanning station 100 or using sensors positioned at a location where the row is stopped by a row stopper or within an area allowing stopping of the conveyor system 280 or by the conveyor system 210 stopping movement. In embodiments having an upper and lower levels 214 and 212, the conveyor of the upper level 214 is distinct from the conveying system 210. As such, the conveyor of the upper level may be stopped or halted when the row is detected within an area reachable by the robotic arm 230 or other sorting device. In an embodiment comprising a row stopper 280, the row stopper or stop area 280 halts the movement of non-compliant rows of board pieces on the conveyor as they approach the accumulation system 240. By stopping the rows at a precise location, the row stopper or stop area 280 ensures that the non-compliant board pieces are properly presented to the robotic arm 230 for rearrangement. This mechanism prevents disruptions in the flow and allows the accumulation system 240 to perform its operations effectively Understandably, any other known system or method for halting a row of board pieces at a specific location on a conveyor system may be used within the scope of the present invention.

The robotic arm 230 is configured to attempt to used the picked wood piece 20 to form a complete row in the accumulation system 240. In some embodiment, the picked piece 20 is released by the robotic arm 230 over one of the sorting rows 242 of the accumulation system 240. To select which sorting row 242 and which position on the sorting row 242, the controller 500 is configured to take into consideration the current positions and length of the wood pieces 20 present on the accumulation rows 242. As such, the controller 500 may be configured to command the robotic arm 230 to place the picked piece 20 to be form a new row or to complete a row 242 having some pieces for which the resulting total length would form a complete row.

In some embodiment, the robotic arm 230 is configured to pick a piece from the accumulation system 240 and to complete the stopped row of wood pieces 20. As an example, a wood piece present in the accumulation system 240 may be of the same length as a non-compliant wood piece picked by the robotic arm 230 in the stopped row. As a result, the robotic arm 230 may pick the said wood piece from the accumulation and place the same in the stopped row to form a complete compliant row. The stop mechanism then releases the compliant row which is conveyed toward the packaging station 400.

The sorting system 200 allows both dynamic combination of wood pieces within the sorting rows 242 and direct row completion on the conveyor 210. For instance, when the robotic arm 230 identifies that a wood piece can complete a row already on the conveyor 210, the sorting system 200 prioritizes completing this row over the rows stocked in the accumulation system 240 or reserve 250. When rows are formed within the accumulation system 240, the sorting rows 242 are equipped with a releasing mechanism 244, which is triggered by the robotic arm 230 once the row is completed. This releasing mechanism pivots 246 to enable the smooth transition of the completed row onto the conveyor 210.

In some embodiments where multiple shorter pieces are received by the sorting system 200, the robotic arm 230 may be configured to prioritize combining the shorter pieces to maximize material efficiency. The robotic arm 230 may be configured to pick compatible wood pieces directly from the stopped row on the conveyor 210 if the available pieces in the sorting rows 242 are insufficient to form a row of the required dimensions. This flexibility ensures that the accumulation system 240 operates efficiently and minimizes waste.

In yet other embodiments, the storage system 200 may be configured to place pieces in the peripheral reserve system 250 to handle excess pieces or temporarily store pieces that cannot immediately be used. The controller 500 monitors the status of all rows 242 and peripheral rows 252 to optimize the flow of wood pieces through the system. By dynamically allocating pieces between the conveyor 210, the accumulation system 240, and the peripheral reserve 250, the overall process is streamlined.

The combination of the robotic arm 230 and the accumulation system 240 represents a significant advancement in automating the sorting and preparation of hardwood flooring pieces. This integration not only improves the utilization of irregularly sized pieces but also enhances the throughput of the entire production line, ensuring that rows of wood pieces are consistently prepared for packaging with minimal or no manual intervention.

The sorting station 200 may further comprise peripheral accumulating system 250. The peripheral accumulating system 250 generally comprises a plurality of peripheral rows 252. The peripheral rows 252 are typically positioned on one or both sides of the conveying system 210. If a piece 20 may not be placed on any of the sorting rows 242 of the accumulation system 240, the robotic arm 230 picks up the said piece 20 and places it on one of the peripheral accumulating rows 252 of the peripheral accumulation system 250. In the illustrated embodiment, the peripheral accumulation system 250 comprises a plurality of inclined shelfs or panels 252. As illustrated, each shelf 252 is position parallel to another shelf 252. The peripheral accumulation system 250 may be positioned along the length of the conveying system 210 or, in some embodiments, may be positioned perpendicular to and over the conveying system 210. As such, the robotic arm 230 may pick a wood piece and release the same on the peripheral accumulation system 250.

Figure 7:
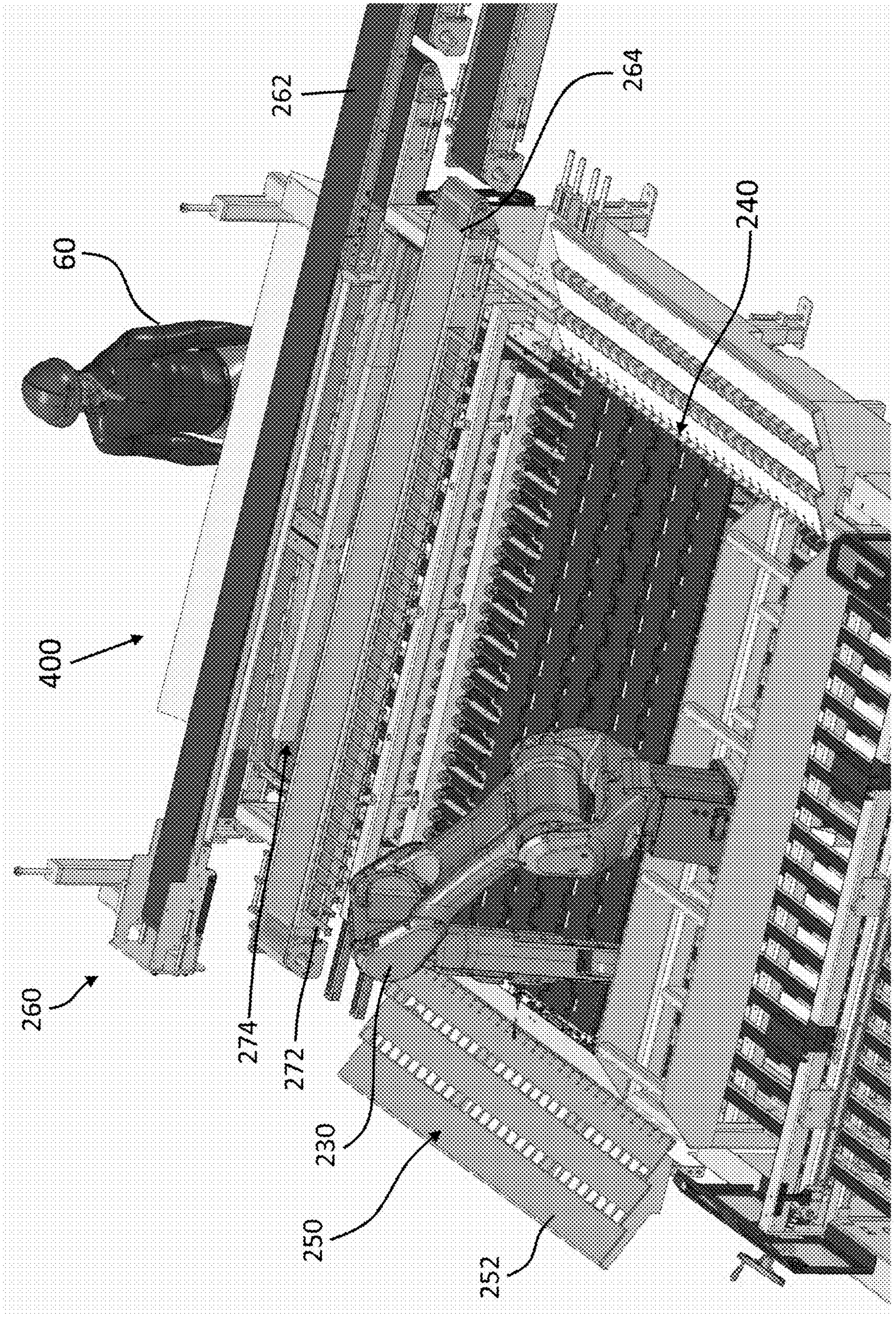
FIG. 7 is a perspective view the sorting station of FIG. 2.

Referring to FIG. 7, the quality validation system port 260 allows forwarding non-compliant pieces 25 picked up by the robotic arm 230 to the quality validation system 300, also referred to as assessment station 300 or repair station 300. The quality validation system port 260 also allows retrieving a wood piece 20 for which quality was validated or was repaired by the quality validation/repair system 300. The repair system port 260 generally comprises a first conveying system 262 to move the non-compliant pieces 25 to the assessment system 300 and a second conveying system 264 to move the pieces 20 approved or repaired by the assessment system 300. As the identified hardwood flooring pieces 20 returning from the assessment system 300 are conveyed on the second conveying system 264, the robotic arm 230 is configured to pick the said piece 20 and to place the picked-up piece 20 on the conveyor 210, on a sorting row 242 or any of the peripheral accumulating rows 252.

In some embodiments, the repair system port 260 may comprise an accumulating system 270 for repaired/inspected boards. The accumulation system 270 is typically positioned adjacent to each of the first 262 and second 264 conveying systems and a distance reachable by the robotized arm 230. The accumulating system 270 may comprise one or more accumulating members 272, typically shaped as elongated surface. The accumulating members 272 are shaped to receive and hold hardwood flooring pieces 20. The robotic member 230 is thus configured to move a non-compliant board on the accumulation member 272 and/or to move the board present on the accumulation member 272 to the conveyor 260 toward the assessment station 300 when said conveyor 260 is free of wood pieces 20.

In the present embodiment, the first 262 and second 264 side conveying systems are generally positioned over the conveying system 210 and are within reach of the robotic arm 230 without limiting the flow on the conveyor 210. The embodied first and second conveying system 262, 264 are belt conveyors. Understandably, any other type of conveying method or system known in the art may be used within the scope of the present invention.

The repair system port 260 may further comprise a push system 274, typically located in-line with the top of the conveying means (262 and/or 264) and the inspection accumulating members 272. The push system 274 is generally adapted to push any plank 20 at a predetermined location on the inspection accumulating element 272 for the robotic arm 230 to properly reach and manipulate said planks 20. It may be understood that the repair system port 260 may comprise any number of conveying means and that each conveying means may either direct boards (20, 25) from or towards the inspection station 300.

Understandably, the robotic arm 230 is further configured to reach and pick and/or place pieces 20 on side conveyors (260, 262), on side conveyors accumulating members 272, on sorting rows 240 and on peripheral accumulating rows 250 and may do so without blocking the conveying of pieces (20 or 25) on the conveyor 210.

Figure 8:
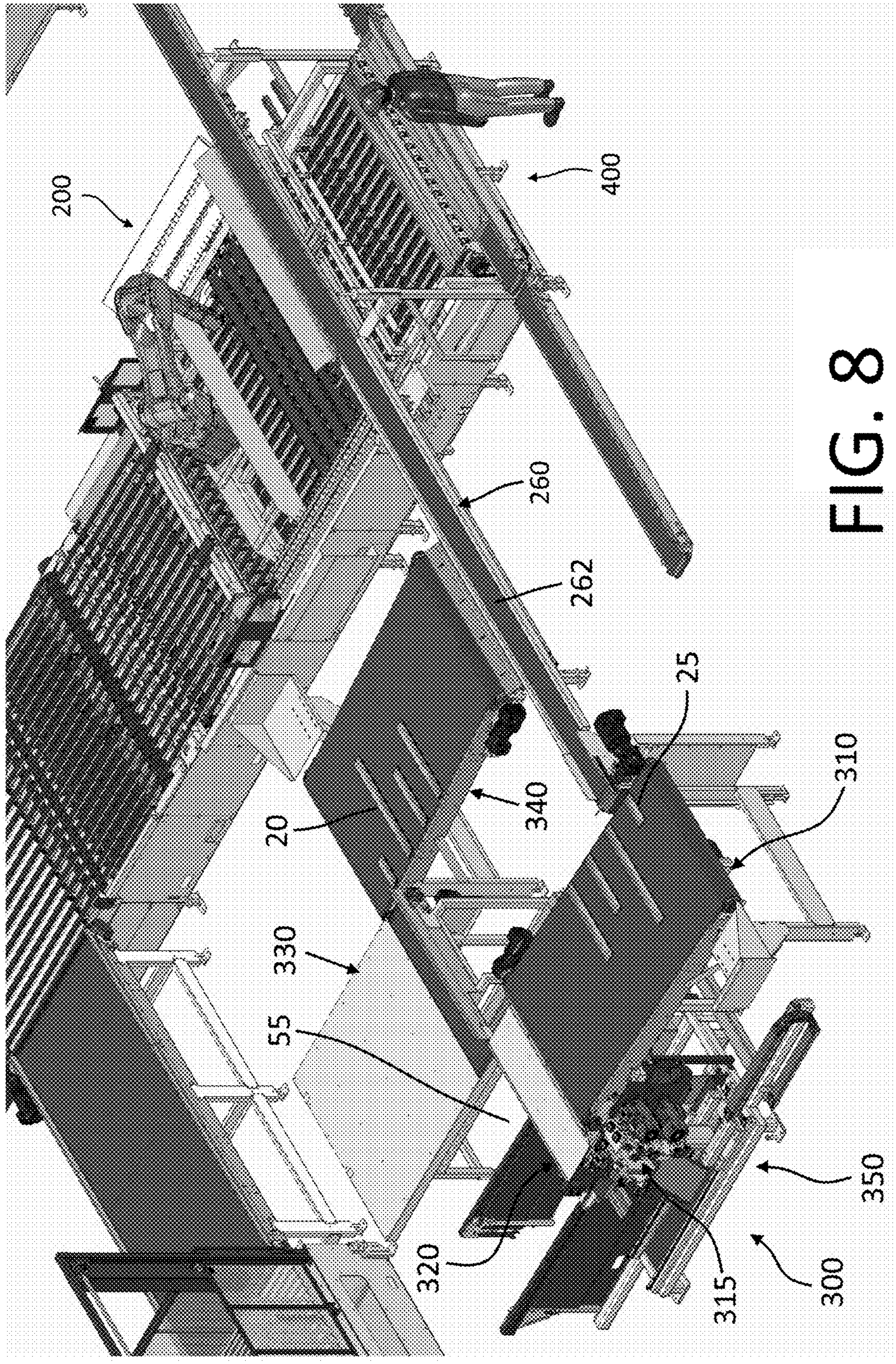
FIG. 8 is a perspective view of an assessment station in accordance with the principles of the present invention.

Referring now to FIG. 8, the assessment station 300 is illustrated within the system 10. The assessment station 300 may be used to assess quality of pieces 25 which were identified by the identification station 100 and rejected by the sorting station 200. In such embodiment, the inspection is performed by an operator 55 which visually inspects the incoming piece 25.

In other embodiments, the assessment station 300 may be used to repair or correct unwanted characteristics identified on the piece 25 by the detection station 100 and received from the sorting station 200. In such embodiment, the operator receives a non-compliant board 25, inspect it for defects and try repairing the defect. If the defect may be repaired, the board 25 is returned to the sorting station 200. If the defect may not be repaired, the board 25 is typically discarded.

In a typical embodiment, the repair/inspection station 300 may be operatively connected to the first 262 and second 264 side conveyors. The assessment station 300 may comprise an input area 310, a repairing area 320, a varnishing area 330 and an output area 340. A rejected piece 25 is moved to the input area 310 of the repair station 300 by the first conveyor 262. In the illustrated embodiment, the input area 310 is embodied as a conveyor. The input area 310 moves the identified piece 25 to the repairing area 320. At the repairing area 320, an operator 55 visually inspects the incoming rejected pieces 25 and determines if said inspected pieces 25 are acceptable or not. Understandably, the position of the illustrated operator 55 is an example only. The operator 55 may be positioned anywhere needed to complete the task.

If the inspector determines that the piece 25 is not acceptable, the operator 55 determines if the piece 25 is repairable. If the piece 25 is repairable, the operator 55 may repair said piece with appropriate tooling, such as knives or other wood tools. For example, a repairing mechanism 315, such as a saw, may be used to cut pieces 25 that are too long or comprise a section having unwanted characteristics such as nots or dents. The varnishing area 330 may be used to varnish the pieces 25 when deemed necessary by the operator 55. The rejected pieces 25 that do not meet predetermined criteria and which are not repairable may be discarded. The discarding generally aims at avoiding slowing or blocking the repair station 300.

If the operator 55 considers the rejected piece 25 to be acceptable or properly repaired, the operator 55 places the resulting accepted piece 20 on the output area 340. The output area 340 is generally embodied as a conveyor. The output area 340 is adapted to move the acceptable pieces 20 to the second conveyor 264 for return to the sorting station 200.

The assessment station 300 may further comprise a computerized feedback device 350 in communication with the controller 500. The feedback device 350 may be operable by the operator 55. When a rejected piece 25 is considered acceptable 20, the operator 55 may input the acceptation in the feedback device 350. The feedback device 350 sends the acceptation to the controller 500. In another embodiment, the feedback device 350 is a scanner located next to the accumulating system 270 to scan the length or dimensions of the repaired and/or accepted pieces 20. The controller 500 is configured to command the robotic arm 230 to pick up the now acceptable piece 20 when the said piece 20 is returned to the sorting station 200. Understandably, any other known means to notify the controller 500 of the updated status of the rejected piece 25 may be used, such as a button, a mobile device, etc. Similarly, the operator 55 may notify the controller 500 of rejected pieces 25 being discarded using the feedback device 350, such as pressing a button. By receiving the feedback information from the feedback device 350, the controller 500 keeps track of the status and characteristics of each piece (25, 20) transiting in and out of the repair station 300. Understandably, instead of having operators 55, the analysis process may be automated by any means known in the art, such as using a sensor or camera in conjunction with an automated analyzing system, such as a system using artificial intelligence. Furthermore, the input 310 and output 340 areas may comprise any other type of conveying system such as but not limited to belt conveyors.

Figure 9:
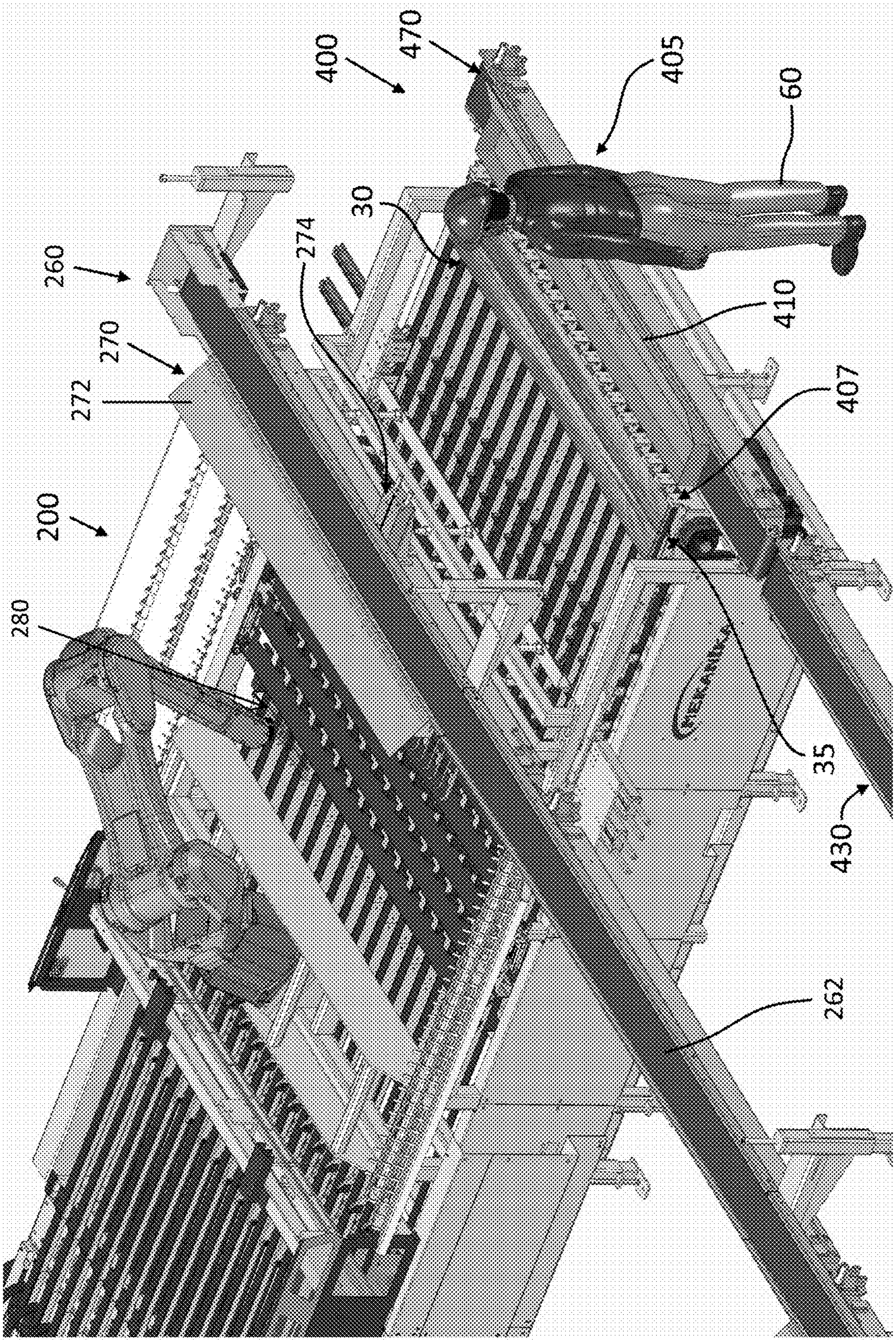
FIG. 9 is a perspective view of the sorting station of FIG. 2 and of a packaging station in accordance with the principles of the present invention.

Now referring to FIG. 9, the packaging station 400 is adapted to receive completed rows 30 of wood pieces 20, typically bundled as layers 35, from the sorting station 200 and to create bundles. A bundle typically comprises a plurality of layers 35 stacked on top of one another. The bundle is fitted in packages 410. In some embodiments, the bundles comprise the rows 30 of the panels 40 are split in a plurality of layers 35 having a surface matching the surface of the package 410. The layers 35 are stacked on top of the other in the package 410. The received layers 35 are generally sized to fill the width of a box 410. In some embodiments, packages 410 are moved to the outfeed of the sorting station 200. Each row 30 incoming from the sorting station 200 is directed to a box 410, or package. An operator 60 may be located at the packaging station 400. The operator 60 may oversee proper filling of the packages 410.

In another embodiment, the packaging station 400 may comprise an automated arm, not shown, an empty packages conveyor 470, a loading area 405 and an outfeed conveying system 430. In some embodiments, the packaging station 400 may further comprise a folding apparatus, not shown. The folding apparatus may be configured to fold a straight cardboard sheet into the shape of a box of desired dimensions and may leave the top of said box opened. The folded packages 410 may then be displaced on the conveyor 470, such as a chain or belt conveyor, towards a location 405 for receiving the board rows 30 from the sorting station 200. The filled packages 410 may be conveyed to a discharge area, not shown, typically using a conveying means 430.

Referring back to FIG. 5, tabs 407 may be used to stop the rows 30 at the outfeed of the sorting station 200, adjacent to the packaging station 400. The planks 20 may fall in the box 410 due to the conveying means 210 of the sorting station 200. Additionally, the operator 60 may help place the boards 20 in the package 410. In other embodiments, an automated arm, not shown, may be adapted to manipulate the received pieces 20 and place said pieces 20 into the packages 410. The automated arm may be a robotic arm having a plurality of joints of rotation. It may further be adapted to manipulate each of the pieces 20 of a row 30 at the same time. In some embodiments, the robotic arm may be embodied and used similarly to the robotic arm 230 of the sorting station 200. Any other type of automated member may be used for moving layers 35, rows 30 and/or pieces 20 from the conveying system 210 to the packages 410. The packages 410 are embodied as boxes having dimensions for storing layers 35 of hardwood flooring pieces 20. The packages 410 may be configured to receive layers 35 stacked on top of each other's and/or rows 30 placed next to other rows 30. Understandably, any other type of known packaging may be envisioned within the scope of the present invention.

The packaging station 400 may further comprise a system for placing dividers between layers 35 when packaging, not shown. The divider may be sheets of cardboard, paper sheets or any other frictionless thin member. The divider is typically positioned over/under stacked layers 35 to minimize damage due to friction or transport. Accordingly, the divider is made of material being softer than the hardwood flooring pieces 20 and/or the coating of the flooring pieces 20, thus minimizing scratches, dents and the like. Understandably, the divider may be manually positioned by the operator 60.

The controller 500 may be embodied as a computerized device, such as a computer, a programmable interface, an automate, etc. The controller 500 generally comprises a central processing device, a memory unit, such as transient and persistent memory units, a network adapter, input/output ports or any other input modules. The controller 500 may be integral to the system 10 or may be remote, such as being remotely hosted through a network. The controller 500 may be configured to receive signals from sensors, apparatus, systems and devices of the system 10 and may be programmed to execute instructions to analyse, identify and/or track each of the hardwood flooring pieces 20, rows 30, layers 25 and/or panels 40 along different stations (100, 200, 300 and 400) of the system 10.

Understandably, the controller 500 may be configured to track and/or manage the status of the system 10. As such, the controller 500 may be configured to calculate the occupancy and the efficiency levels of each of the stations (100, 200, 300 and 400). The controller 500 may further be configured to stop or slow the operations of the system 10 or of different stations when anomalies or problems are identified in the system 10. For example, the controller 500 may be programmed to only route panels 40 towards a subset of sorting stations 200 if one of the sorting stations 210 is defective or in maintenance mode.

In some embodiments, the controller 500 may be programmed to use artificial intelligence and training methods to improve detection of anomalies in the pieces 20 or to improve the flow of the system 10. In some embodiments, the system 10 comprises a user interface 510, not shown, wherein users may control some of the stations of the system 10.

Figure 10:
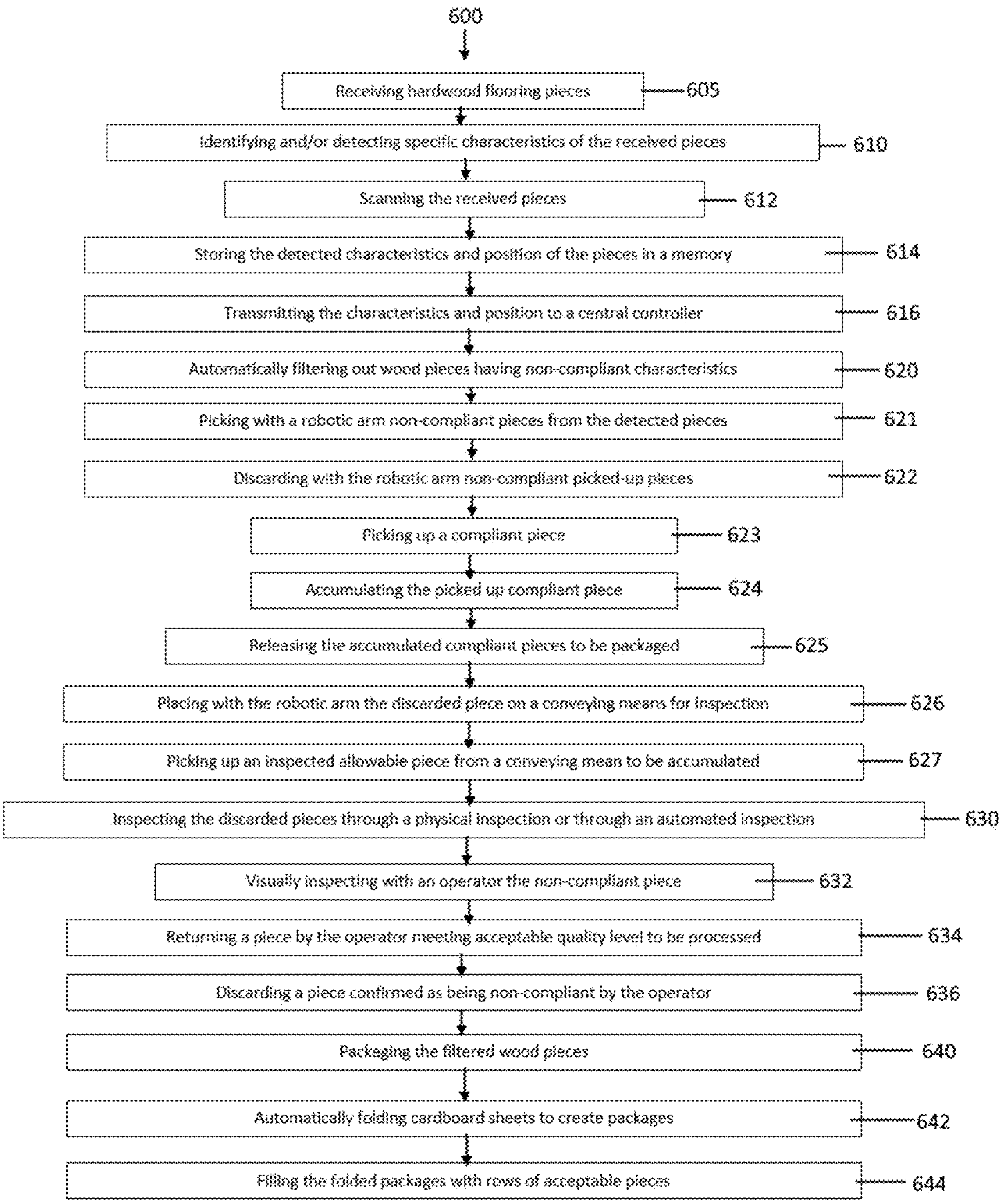
FIG. 10 is a diagram of an embodiment of a method for analysing, sorting and packaging hardwood flooring pieces in accordance with the principles of the present invention.

Now referring to FIG. 10, a method 600 for analysing, sorting and packaging hardwood flooring pieces is provided. The method 600 comprises receiving hardwood flooring pieces 605, identifying and/or detecting specific characteristics of the received pieces 610, and automatically filtering out wood pieces having non-compliant characteristics 620. The method may further comprise packaging the filtered wood pieces 640.

The identification and detection of specific characteristics of the received pieces 610 may further comprise scanning the received pieces 612, storing the detected characteristic and position of the pieces in a memory 614 and transmitting the characteristics and position to a central controller 616.

The step to automatically filter out wood pieces having non-compliant characteristics 620 may further comprise a robotic arm picking non-compliant pieces from the detected pieces 621. The step 620 may further comprise the robotic arm discarding the non-compliant picked-up pieces 622. The step 620 may further comprise picking up a compliant 623 piece and accumulating the picked up compliant piece 624. The step 620 may further comprise releasing the accumulated compliant pieces to be packaged 625.

The method may further comprise inspecting the discarding pieces through a physical inspection or through an automated inspection 630. In such embodiment, the step 620 may further comprise the robotic arm placing the discarded piece on a conveying means for inspection 626 and picking up an inspected allowable piece from a conveying mean to be accumulated 627. The step 630 may further comprise an operator visually inspecting the non-compliant piece 632 and the operator returning a piece meeting acceptable quality level to be processed 634 or the operator discarding a piece confirmed as being non-compliant 636.

The packaging of the filtered wood pieces 640 may further comprise automatically folding cardboard sheets to create packages 642, filling the folded packages with rows of acceptable pieces 644 and discharging the filled packages 646.

Figure 11:
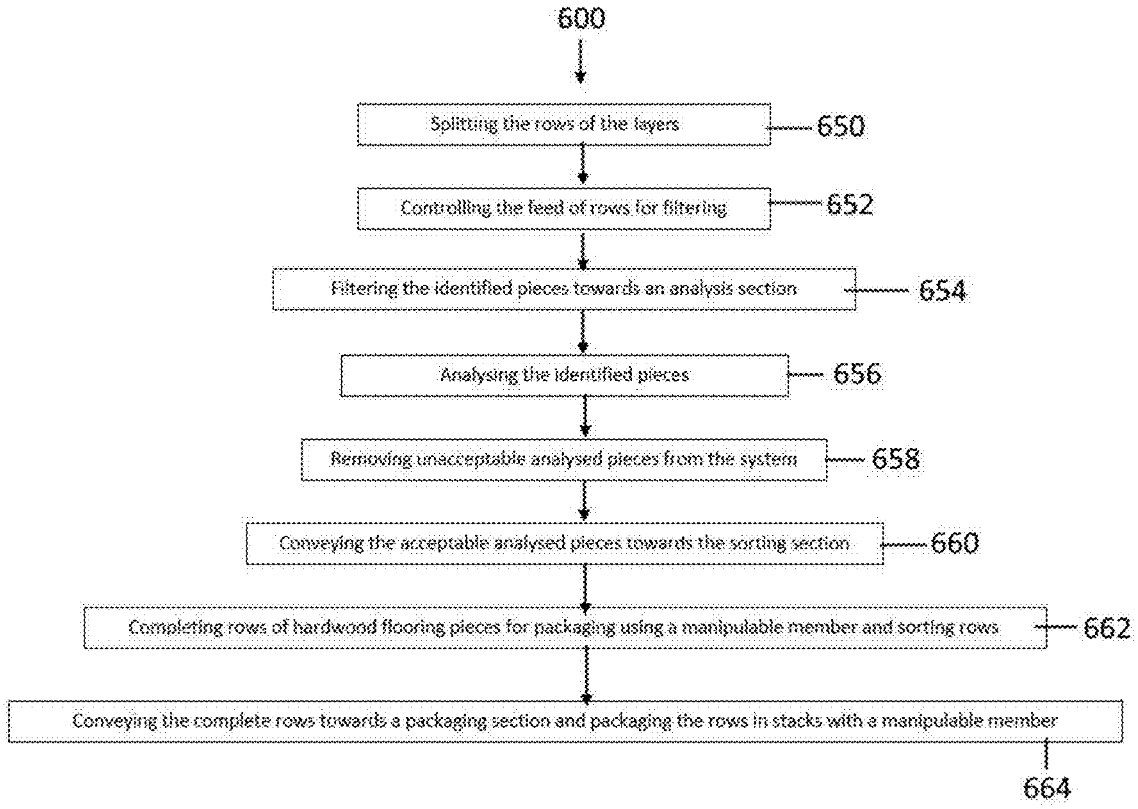
FIG. 11 is a diagram of another embodiment of the method for analyzing, sorting and packaging hardwood flooring pieces in accordance with the principles of the present invention.

As seen in FIG. 11, another embodiment of the method 600 may further comprise splitting the rows of the layers 650 or of a panel and controlling the feed of rows for filtering 652, filtering the identified pieces towards an analysis section 654, analysing the identified pieces 656, removing unacceptable analysed pieces from the system 658, conveying the acceptable analysed pieces towards the sorting section 660, completing rows of hardwood flooring pieces for packaging using a manipulable member and sorting rows 662, conveying the complete rows towards a packaging section and packaging the rows in stacks with a manipulable member 664. Understandably, the manipulable member may be a mechanism such as a robotic arm or may be a user using his hands.

While illustrative and presently preferred embodiment(s) of the invention have been described in detail hereinabove, it is to be understood that the inventive concepts May be otherwise variously embodied and employed and that the appended claims are intended to be construed to include such variations except insofar as limited by the prior art.

The invention claimed is:

1. A system for automatically sorting board pieces of panel of pieces comprising a plurality of rows, the system comprising:

a board characteristic detector for inspecting and identifying characteristics of the board pieces of the panel;

an automatic board splitter for separating the rows of the panel identified by the detector as comprising one or more board piece having non-compliant characteristics, an automatic row builder for receiving board pieces identified as being compliant and forming complete rows of compliant board pieces.

2. The system of claim 1 comprising a robotic arm for picking split board pieces identified as being compliant or as having one or more non-compliant characteristics amongst the board pieces of the split row.

3. The system of claim 2, wherein the robotic arm is configured to combine the picked board pieces to form one or more rows having a predetermined length and comprising compliant board pieces.

4. The system of claim 3, wherein the row builder comprises one or more sorting rows for forming the one or more rows of compliant board pieces.

5. The system of claim 4 further comprising a stop area adapted to stop the split row upstream of the row builder.

6. The system of claim 5, the robotic arm being configured to replace one or more board pieces identified as having one or more non-compliant characteristics amongst the split board pieces of the stopped split row with a board piece present on the one or more sorting rows.

7. The system of claim 5, the robotic arm being configured to pick a board piece identified as being compliant from the stopped row and to move the picked board piece to one of the one or more sorting rows to form a compliant row.

8. The system of claim 3, wherein the sorting row further comprises a releasing mechanism to release the board pieces present on the sorting row.

9. The system of claim 8, wherein the releasing mechanism comprises actuated pivot.

10. The system of claim 2, further comprising a controller in data communication with the board characteristic detector, the robotic arm, and the row builder, the controller being configured to monitor and manage the building of rows comprising compliant board pieces.

11. The system of claim 1, further comprising a peripheral accumulation system handling excess or temporarily unused board pieces.

12. The system of claim 1 further comprising a conveyor for routing the split row comprising compliant board pieces to be further processed and for routing the split row comprising at least one board piece having one or more non-compliant characteristics toward the automatic row builder.

13. The system of claim 12, the conveyor comprising superposed upper and lower conveyors, the upper conveyor routing the split row to the automatic row builder and the lower conveyor routing the split row to be further processed.

14. A method for automatically sorting and combining compliant board pieces of a panel pieces, the method comprising:

detecting characteristics of the board pieces of the panel;

splitting rows of the board pieces of the panel identified by a detector as comprising one or more board piece having non-compliant characteristics;

removing one or more board pieces from the split row;

combining compliant board pieces to form compliant rows having a total predetermined length;

combining the board pieces identified as being compliant to form one or more rows having predetermined length.

15. The method of claim 14, the removal of the board pieces comprising removing the board pieces having non-compliant characteristics from the split row.

16. The method of claim 15 further comprising replacing the removed non-compliant board piece with an accumulated board piece identified as being compliant.

17. The method of claim 14, the removal of the board pieces comprising removing one or more of the board pieces identified as compliant to add to a row of compliant board pieces.

18. The method of claim 17 further comprising accumulating the removed compliant board pieces to be combined with compliant board pieces to be remove from another split row to form a row of compliant board pieces having the predetermined length.

19. The method of claim 14 comprising releasing the combined board pieces forming a compliant row to be further processed.

20. The method of claim 14, further comprising prioritizing the combination of shorter board pieces to maximize material efficiency.

* * * * *